Nov. 27, 1956 J. M. MILLER, JR 2,772,329

CORRECTION OF DISTORTION IN PUSH-PULL AMPLIFIERS

Filed Feb. 23, 1951 2 Sheets-Sheet 1

JOHN M. MILLER, JR.
*INVENTOR.*

*BY*

Killman and Kerst

Nov. 27, 1956 J. M. MILLER, JR 2,772,329

CORRECTION OF DISTORTION IN PUSH-PULL AMPLIFIERS

Filed Feb. 23, 1951 2 Sheets-Sheet 2

JOHN M. MILLER, JR.
*INVENTOR.*

*BY*

Killman and Kerst 2,772,329
Patented Nov. 27, 1956

2,772,329

CORRECTION OF DISTORTION IN PUSH-PULL AMPLIFIERS

John M. Miller, Jr., Baltimore, Md., assignor to Bendix Aviation Corporation, Towson, Md., a corporation of Delaware Application February 23, 1951, Serial No. 212,441

3 Claims. (Cl. 179—171)

This invention relates to vacuum tube amplifiers and is particularly concerned with amplifiers composed of two tubes connected in push-pull. It is of special value with respect to push-pull amplifiers operated with a grid bias approximately equal to the cut-off voltage value of the tubes and known as class B amplifiers. Such amplifiers are subject to distortion due to the departure of the tube characteristics from straight lines. While it is of special value in connection with class B amplifiers, it can be advantageously employed for the reduction of distortion in push-pull amplifiers of other types, including class A amplifiers. In this respect it should be remembered that the nominal class B amplifier acts, at low signal levels, as a class A amplifier. In practical tests a very considerable reduction of distortion has been observed at such levels as well as at higher levels where transition to class B operation occurs.

Distortion from this cause has been successfully reduced by selection of the value of fixed bias applied to the tubes, in a manner which will later be more fully described. Control of distortion in this fashion has, however, introduced the necessity for strict regulation of the grid bias and plate voltage since any variation in these voltages introduces an irregularity into the composite characteristic curve and thus reestablishes the condition sought to be avoided.

In order to eliminate these onerous requirements, special tubes have been designed with a sufficiently high amplification factor that they may be operated at a zero bias. While this expedient removes many of the difficulties related to the bias, the necessity for special tubes is in itself a burden. Even with these tubes the tendency to distortion remains to such an extent that class B amplifiers have gone into use only in applications where power conversion efficiency is deemed to be more important than fidelity of amplification.

It is an object of this invention to provide a method and means for substantially reducing the distortion normally present in the output of push-pull amplifiers.

It is another object of the invention to reduce distortion in such amplifiers without introducing any severe requirements as to voltage regulation.

It is a further object of the invention to reduce distortion in such amplifiers by means which is simple and is non-critical in operation.

It is still another object of the invention to reduce distortion in such amplifiers by means which does not require the design of special tubes or components.

The above and other objects and advantages of the invention are realized by the application of a supersonic bias voltage to the amplifier.

Figures 1, 3:
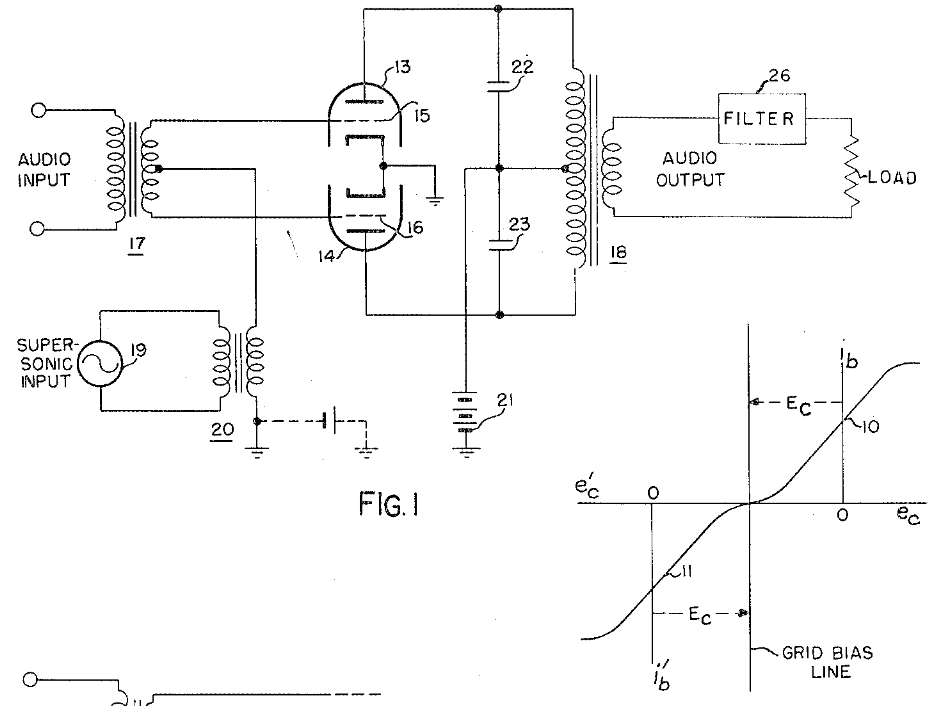
Fig. 1 is a schematic drawing of a circuit embodying the invention.
Fig. 3 is a graph of the composite characteristic curve of a push-pull class B amplifier.
Figure 4:
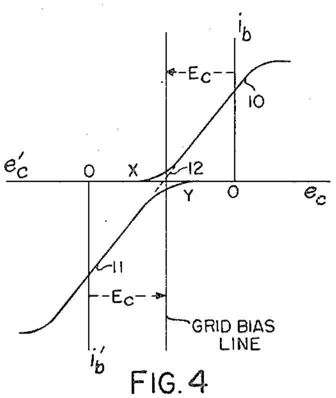
Figure 5:
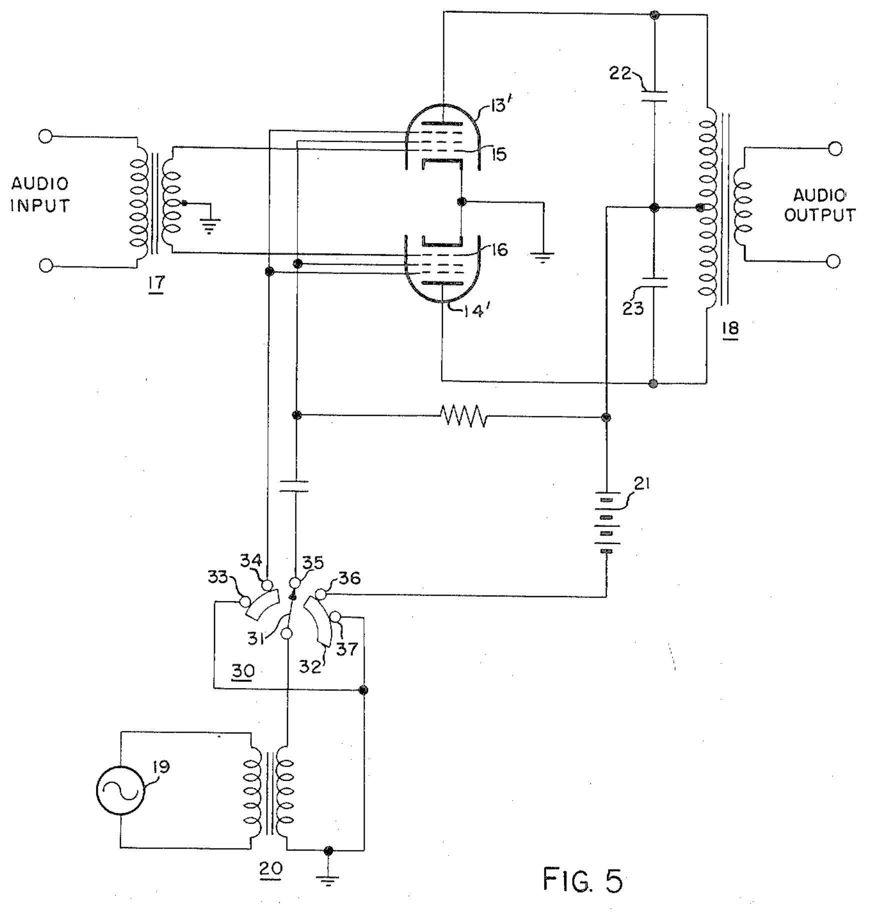

Fig. 4 is a graph similar to that of Fig. 3 showing the curve resulting from a selection of bias level to bring the straight portions of the individual characteristic curves into line; and, Fig. 5 is a schematic diagram of a circuit similar to that of Fig. 1 but in which a switch is incorporated for applying the alternating current bias to either the screen or suppressor grids of the amplifier tubes, or to the anodes thereof.

The graph of Fig. 3 is a composite arrangement of the characteristic curves of the two tubes of a push-pull class B amplifier. It will be noted that each of these curves 10 and 11 has a straight central portion with a knee at each extremity. The knees occurring at the remote ends of these curves need give no trouble but those occurring at the low plate current ends of the curves introduce considerable distortion. The amount of grid bias is shown by the dashed lines Ec between the zero grid voltage points and the grid bias line. Graphs of this type and that of Fig. 4 may be found in many standard texts in the electronic engineering field.

In order to reduce this distortion there has been conventionally adopted the expedient of regulating the bias voltage to a level at which the straight portions of the characteristics lie along a common straight line. This condition is illustrated in Fig. 4 in which the straight portions of the characteristic lines 10 and 11 are joined by a dashed line 12. Under this operating condition both tubes will be carrying current during the integral XY where their characteristics overlap. During this time the net current flowing will be the difference between that indicated on the two curves, as represented by the dashed line 12. While distortion is materially reduced by this means when the two tubes have identical characteristics, it becomes necessary to maintain very good regulation of the grid bias and plate supply voltages. Any slight variation in the grid bias or plate voltage is equivalent to sliding the individual characteristic curves laterally with respect to each other and thus establishing again the conditions of Fig. 3 or an equivalent. It is difficult to supply a suitable source of grid bias to meet this requirement. Except for radio transmitters it is uneconomical to provide a separate source of direct grid voltage. The usually employed expedient of obtaining grid bias by means of the drop across a cathode resistor is unsatisfactory because of the great variation in the flow of plate current over the cycle of operation.

In order to resolve these difficulties the so-called zero-bias tubes have been designed with high amplification factors such that an approximation to the desired relationship of the characteristic curves occurs at zero bias. While this alleviates bias difficulties, distortion remains, which is increased by tube differences and poor regulation of plate supply voltage.

Applicant has discovered that distortion difficulties in push-pull amplifiers can be remarkably improved by replacing or supplementing the fixed bias with an alternating current bias having a frequency higher than that of the signal. While the term "supersonic bias" is used herein in connection with this bias, it is to be understood that the frequency employed may be in the radial frequency range, if desired, frequencies in the megacycles being suitable.

A preferred embodiment of the invention is illustrated in Fig. 1 which shows a push-pull class B amplifier circuit comprising two triodes 13 and 14 having control grids 15 and 16. The grids are connected to respective terminals of the secondary winding of input transformer 17, to the primary winding of which an audio signal is applied. The anodes of the tubes are connected to respective terminals of the primary of an output transformer 18, the secondary of which supplies the audio output of the amplifier to a utilization circuit. A source 19 of supersonic alternating current is provided, having its output applied to the primary of a transformer 20. One terminal of the secondary of this transformer is grounded and the other is connected to the center tap of the secondary winding of transformer 17.

The center tap of the primary of transformer 18 is connected to ground through a source of plate supply voltage 21 and a pair of by-pass condensers 22 and 23 are connected between the center tap of the primary and its respective terminals. These condensers should be large enough to by-pass the supersonic voltage but not the desired audio frequency components. If desired the output circuit of the amplifier may be provided with a filter 26 for removing any residual supersonic voltage.

The operation of the circuit is identical with that of the conventional amplifier of this type except for the effect of the supersonic bias. This is apparent as a very great reduction of distortion in the output at low and medium audio output power levels and a considerable reduction at high power levels. It is believed that this effect is produced by means of an integration of the instantaneous outputs of each tube as the bias sweeps the characteristic curves rapidly back and forth, during each increment of audio voltage, through a range determined by its amplitude. By this means the transfer curve of Fig. 4 is composed of the averaged values of currents corresponding to both medium and low current regions of the individual tube curves, and the deviations from linearity which give rise to distortion are smoothed by virtue of being spread over a greater portion of the curve.

In the field of magnetic recording high frequency bias has been applied to the recording head for the purpose of reducing distortion. That application has been in push-pull as contrasted with the application in parallel to the input circuits of a push-pull amplifier in accordance with the instant invention, as illustrated in Fig. 1.

Figure 2:
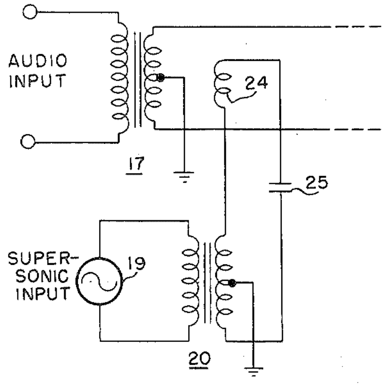
Fig. 2 is a schematic drawing of a portion of the circuit of Fig. 1 showing a modification of that circuit.

While it is possible to apply the high frequency bias in push-pull to a push-pull amplifier as indicated in Fig. 2, this manner of application requires such additional expense as to render the expedient undesirable.

In the circuit of this figure the terminals of the secondary of transformer 20 are connected in series with a coil 24 coupled to the secondary of transformer 17. The center-tap of the secondary of transformer 20 is grounded. The capacity of the condenser 25 is selected so that it will pass the bias currents fairly freely, but will block currents of audio frequency so that the audio input will not be wasted in the generator of the supersonic bias.

The operation of this circuit will not be the same as that of the circuit of Fig. 1 since the characteristic curves 10 and 11 of Fig. 4 will not be shifted transversely in opposite directions but the whole composite curve will be shifted back and forth laterally as a unit. A circuit of this type will have a large output at the bias frequency and this will require expensive filters for its elimination. In addition, if an iron core output transformer is used, it must be made much larger in order to dissipate the heat due to increased core losses.

For the above reasons the circuit of Fig. 2 is not considered a practical solution to the problem.

Although the circuits illustrated show the application of supersonic bias to the grids of the tubes, it may be applied instead to the plates or cathodes, or, if multi-grid tubes are used, to the screen grids. When applied to the grid circuits, the load presented by the grid circuit to the secondary of the driving transformer 17 is then more uniform than in the absence of the supersonic bias. Further, the transition of this load from one half of the secondary to the other is distributed over a greater portion of the audio frequency cycle, thus materially reducing the influence of the leakage reactances appearing between and across the several portions of the transformer windings.

Fig. 5 shows a circuit in which the triodes 13 and 14 of Fig. 1 have been replaced with pentodes 13′ and 14′.

A switch 30 is provided by which the supersonic bias from source 19 can be applied to the screen or suppressor grids of the tubes or to their plates. The switch comprises a switch arm 31 and a conductive plate 32 rotating as a unit and insulated from each other. The arm 31 overlies an opening in the plate 32 so that only one of the two can make contact with the fixed contacts of the switch. The switch is provided wtih fixed contacts 33 to 37 inclusive. Contacts 33 and 37 are grounded, 34 is connected in parallel to the suppressor grids of the tubes, 35 is connected in parallel to the screen grids and 36 is connected to the plates through plate voltage supply source 21.

Tests of a circuit similar to that of Fig. 1, using zero-bias tubes, have shown as high as a 79 percent reduction in distortion at one watt output, 78 percent at five watts output and 55 percent at ten watts output as compared with zero-bias operation. From these results it will be noted that the greatest reduction in distortion occurs at levels of five watts or less. The actual reduction in distortion was undoubtedly greater than was observed due to the presence of distortion in the audio signal generator which detracted from the accuracy of the lower values of distortion readings.

The amount of bias required is not at all critical at low levels but is moderately critical at the five watt level. The optimum level is readily ascertained by adjustment and observation. The optimum adjustment for the five watt level proved to be optimum as well for all lower output levels.

Only a moderate amount of supersonic bias power is required and it can be developed easily in a class C oscillator since wave form is not critical. When an amplifier of this type is used as a modulator for a class C final R. F. stage in a radio transmitter a portion of the unmodulated station carrier power can be used as bias.

When fixed bias is applied having a value selected to minimize distortion, the superimposition of the supersonic bias is still effective to reduce the distortion from this minimized value to a lower value than that obtained by the application of either bias alone. A typical circuit arrangement is that including the dotted line portion of Fig. 1 instead of the full line to ground. The improvement brought about by a suitable value of supersonic bias is much greater than that obtainable by choice of a suitable value of static bias when applied to a class AB or B amplifier employing the tubes suited to such an amplifier. A class A amplifier will require a static bias, by definition, but here the application of the supersonic bias permits a reduction in distortion beyond that attainable by the best choice of the static bias.

What is claimed is:

1. An amplifier circuit comprising two electron discharge tubes having their input and output circuits connected for push-pull operation, a source of alternating current voltage having a frequency above the signal frequency range, said source deriving said alternating current voltage independently of alternating current voltages existing in the remainder of said amplifier circuit, means applying the voltage of said source cophasally to said input circuits as bias voltage, load means recovering from the output circuits of said tubes the energy content within the signal frequency range, and means in said output circuits removing therefrom energy having the frequency of said alternating current voltage.

2. An amplifier circuit comprising a pair of electron discharge tubes each having an input and an output circuit, a source of signal voltage of audio frequency, a source of alternating current voltage having a frequency above said signal frequency, the last-named source deriving said alternating current voltage independently of alternating current voltages existing in the remainder of said amplifier circuit, means coupling the voltage of the first-named source to said input circuits in phase opposition, means coupling the voltage of the last-named source cophasally to said input circuits, load means recovering from the output circuits of said tubes the energy content within the signal frequency range, and means in said output circuits removing therefrom energy having the frequency of said alternating current voltage.

3. An amplifier circuit comprising two electron discharge tubes having their input and output circuits connected for push-pull operation, said tubes being biased by an amount sufficient to cause the straight portions of their dynamic characteristic curves to lie along the same line when said curves are plotted with respect to a common base line, a source of signal voltage, a source of alternating current voltage having a frequency above the frequency range of said signal voltage, the last-named source deriving said alternating current voltage independently of alternating current voltages existing in the remainder of said amplifier circuit, means coupling said alternating current voltage cophasally to said input circuits as bias voltage, load means recovering from the output circuits of said tubes the energy content within the signal frequency range and means in said output circuits removing therefrom energy having the frequency of said alternating current voltage.

References Cited in the file of this patent

UNITED STATES PATENTS

| | | |
|---|---|---|
| 1,428,156 | Espenchied | Sept. 5, 1922 |
| 2,129,313 | Whitelock | Sept. 6, 1938 |
| 2,238,259 | Hogen | Apr. 15, 1941 |
| 2,257,840 | Dubilier | Oct. 7, 1941 |
| 2,393,936 | Romander | Jan. 29, 1946 |
| 2,411,362 | Boykin | Nov. 19, 1946 |
| 2,527,406 | Donker | Oct. 24, 1950 |

FOREIGN PATENTS

| | | |
|---|---|---|
| 611,065 | Great Britain | Oct. 25, 1948 |